United States Patent
Honda (10) Patent No.: US 11,131,359 B2
(45) Date of Patent: Sep. 28, 2021

(54) TORQUE ADJUSTMENT FUNCTION-PROVIDED ROTARY DAMPER

(71) Applicant: Tok, Inc., Tokyo (JP)

(72) Inventor: Wataru Honda, Tokyo (JP)

(73) Assignee: TOK, INC., Tokyo (JP)

( * ) Notice: Subject to any disclaimer, the term of this patent is extended or adjusted under 35 U.S.C. 154(b) by 50 days.

(21) Appl. No.: 16/623,645

(22) PCT Filed: Jul. 5, 2018

(86) PCT No.: PCT/JP2018/025558
§ 371 (c)(1),
(2) Date: Dec. 17, 2019

(87) PCT Pub. No.: WO2019/013096
PCT Pub. Date: Jan. 17, 2019

(65) Prior Publication Data
US 2020/0200230 A1    Jun. 25, 2020

(30) Foreign Application Priority Data
Jul. 13, 2017    (JP) .............................. JP2017-137460

(51) Int. Cl.
*F16F 9/12*    (2006.01)
*F16F 9/14*    (2006.01)
*F16F 9/34*    (2006.01)

(52) U.S. Cl.
CPC .............. *F16F 9/145* (2013.01); *F16F 9/12* (2013.01); *F16F 9/34* (2013.01); *B60G 2202/22* (2013.01);
(Continued)

(58) Field of Classification Search
CPC ................. F16F 9/12; F16F 9/34; F16F 9/145
(Continued)

(56) References Cited

U.S. PATENT DOCUMENTS

| | | | |
|---|---|---|---|
| 4,411,341 A * | 10/1983 | Schultz | F16F 9/145 16/57 |
| 9,539,873 B2 * | 1/2017 | Willems | F16F 13/005 |

(Continued)

FOREIGN PATENT DOCUMENTS

| | | |
|---|---|---|
| JP | 08-303513 A | 11/1996 |
| JP | 2001-138254 A | 5/2001 |
| JP | 2016-016211 A | 2/2016 |

OTHER PUBLICATIONS

English language International Search Report for corresponding PCT/JP2018/025558 (1 page).

*Primary Examiner* — Christopher P Schwartz
(74) *Attorney, Agent, or Firm* — Flynn Thiel, P.C.

(57) ABSTRACT

A torque adjustment function-provided rotary damper capable of easily adjusting a torque without needing to use a tool, even in a case where a space cannot be secured on an end portion side of a casing. An adjustment lever is an operation member having an engagement portion and a knob portion. The engagement portion links with an adjuster by engaging with an adjustment end portion such that a cutout fits to a fitting portion. The knob portion is formed integrally with the engagement portion by protruding radially from an outer periphery side of a the casing. The knob portion extends to a guide portion along an axial direction of the casing in its outer periphery. The guide portion has a semi-ring shape which is partially cut out. The guide portion is rotatably disposed along an outer periphery of a shaft side cap that closes an end portion of the casing.

5 Claims, 5 Drawing Sheets

(52) U.S. Cl.
CPC ..... *E05Y 2201/21* (2013.01); *E05Y 2201/256* (2013.01); *E05Y 2201/266* (2013.01); *F16F 2232/02* (2013.01)

(58) Field of Classification Search
USPC ................. 188/290, 292, 293; 16/49, 54, 57
See application file for complete search history.

(56) References Cited

U.S. PATENT DOCUMENTS

| | | | |
|---|---|---|---|
| 10,480,229 B2 * | 11/2019 | Vinoth Kannan ...... | F16F 9/145 |
| 10,823,247 B2 * | 11/2020 | Kaneko .................. | F16F 9/145 |
| 2003/0111308 A1 * | 6/2003 | VanValkenburgh .... | F16F 9/145 |
| | | | 188/290 |
| 2009/0266660 A1 * | 10/2009 | Saito ....................... | F16F 9/145 |
| | | | 188/290 |
| 2014/0360825 A1 * | 12/2014 | Willems .................. | F16F 15/03 |
| | | | 188/292 |

* cited by examiner

TORQUE ADJUSTMENT FUNCTION-PROVIDED ROTARY DAMPER

TECHNICAL FIELD

The present invention relates to a rotary damper which applies a braking torque to rotation if a rotary member to be accommodated in a casing is rotated in a specific direction, and particularly relates to a torque adjustment function-provided rotary damper which can adjust a magnitude of the braking torque.

BACKGROUND ART

The related art, for example, JP-A-H8-303513, discloses this type of the torque adjustment function-provided rotary damper.

The rotary damper includes a cylindrical casing internally filled with a viscous fluid, a rotary shaft rotatably mounted on the casing, and a movable valve which opens and closes circulation of the viscous fluid. The casing internally has a flange for supporting a tip of the rotary shaft, and the flange has a pair of fluid passage holes. A side of the flange opposite to the rotary shaft has a torque adjustment disc in which a flange side surface has an orifice groove that communicates with the pair of fluid passage holes. The orifice groove is configured so that a cross-sectional area thereof is changed over an entire length, and a slotted groove is formed on a surface of the torque adjustment disc opposite to the flange side surface. A tip of a slotted screwdriver is inserted into the groove, the slotted screwdriver is rotated, and the torque adjustment disc is rotated. In this manner, a flow rate of the viscous fluid passing through the orifice groove via the pair of fluid passage holes is variable. Therefore, a magnitude of a torque applied for braking the rotation of the rotary shaft is adjusted by the slotted screwdriver in accordance with a rotating amount of the torque adjustment disc.

SUMMARY

However, according to the torque adjustment function-provided rotary damper in the related art disclosed in JP-A-H8-303513, a tool such as a slotted screwdriver is needed to adjust a torque. In order to adjust the torque in a state where the rotary damper is attached to devices, a space for accessing the slotted groove formed on an end surface of the torque adjustment disc needs to be disposed on an end portion side of the casing. In a state where the space is not secured, a tool such as a screwdriver cannot be inserted into the slotted groove. Therefore, in a case where the space is not secured on the end portion side of the casing, in order to adjust the torque of the torque adjustment function-provided rotary damper in the related art, the rotary damper needs to be removed once from the devices. Consequently, the torque cannot easily be adjusted.

The present invention is made to solve the problem.

There is provided a torque adjustment function-provided rotary damper including a casing that internally has a pressure chamber, a rotary member whose shaft portion is rotatably accommodated in the pressure chamber, a flange wall that is formed by closing one end portion side of the pressure chamber, that rotatably supports a tip of the shaft portion, and in which a pair of fluid passage holes penetrating the pressure chamber and communicating with the inside and outside of the pressure chamber is formed at an interval in a circumferential direction, a viscous fluid that internally fills the pressure chamber, a valve mechanism that forms a large flow path of the viscous fluid around the shaft portion if the rotary member is rotated in one direction, and that applies a braking torque to the rotation of the rotary member by closing the large flow path if the rotary member is rotated in the other direction, and a torque adjustment member that is rotatably disposed in the casing by coming into contact with a surface of the flange wall opposite to the pressure chamber, and in which a groove communicating with the pair of fluid passage holes is formed on a surface which the flange wall contacts so that a cross-sectional area is changed in the circumferential direction. The torque adjustment member has an adjustment end portion exposed from the casing. The rotary damper includes an operation member having an engagement portion to be linked with the torque adjustment member by engaging with the adjustment end portion, and a knob portion formed integrally with the engagement portion by protruding in a radial direction from an outer periphery side of the casing.

According to this configuration, in a state where the rotary damper is attached to devices, even in a case where a space cannot be secured on an end portion side of the casing of the rotary damper, the knob portion of the operation member protrudes in the radial direction from the outer periphery side of the casing. Therefore, the knob portion can be touched from the outer periphery side of the casing. Therefore, the knob portion of the operation member is touched, and the knob portion is rotated along the outer periphery of the casing. In this manner, the torque adjustment member in which the adjustment end portion engages with the engagement portion of the operation member is rotated together with the knob portion. Therefore, without needing to use a tool such as a screwdriver, and even in a case where the space cannot be secured on the end portion side of the casing of the rotary damper, the torque can easily be adjusted by rotating the torque adjustment member.

In addition, according to the present invention, the engagement portion may detachably engage with the adjustment end portion.

According to this configuration, the engagement portion of the operation member and the adjustment end portion of the torque adjustment member are disengaged from each other, and the operation member can be detached from the rotary damper. Therefore, after the torque of the rotary damper is adjusted by the operation member, the operation member is detached from the rotary damper. Accordingly, the rotary damper adjusted to have a desired braking torque can be reduced in size and weight so as to be attached to the devices.

In addition, according to the present invention, the operation member may have a guide portion to be rotatably disposed along an outer periphery of a lid that closes a casing end portion on a side opposite to a side where the adjustment end portion is exposed, or along an outer periphery of the casing at a location away from the casing end portion where the adjustment end portion is exposed. The knob portion may extend to the guide portion along an axial direction of the casing in the outer periphery of the casing.

According to this configuration, the knob portion of the operation member extends to the guide portion from the casing end portion where the adjustment end portion is exposed. Accordingly, a range where the knob portion can be touched is broadened. Therefore, in various states where the rotary damper is attached to the devices, the knob portion can easily be touched. Therefore, an operation range of the operation member is broadened, the torque can easily be adjusted in various attachment situations of the rotary damper.

In addition, according to the present invention, the knob portion may have a knob side projection or a knob side groove formed on a surface facing the outer periphery of the casing. The outer periphery of the casing may have a plurality of casing side grooves engaging with the knob side projection or a plurality of casing side projections engaging with the knob side groove.

According to this configuration, if the knob portion is rotated along the outer periphery of the casing, the knob side projection or the knob side groove formed in the knob portion successively engages with the plurality of casing side grooves or the plurality of casing side projections formed in the outer periphery of the casing.

A rotation position of the knob portion is maintained at any engagement position thereof. In addition, if the knob portion is rotated, a click feeling is obtained by the engagement between the projection and the groove. Therefore, an operator of the operation member is likely to recognize the engagement position between the knob portion and the casing, that is, the rotation position of the torque adjustment member. Therefore, the operator of the operation member can tactilely identify a magnitude of the braking torque for adjusting the torque.

In addition, according to the present invention, the engagement portion may detachably engage with the adjustment end portion. The guide portion may detachably be disposed in the outer periphery of the lid or in the outer periphery of the casing.

According to this configuration, the engagement portion of the operation member and the adjustment end portion of the torque adjustment member are disengaged from each other, and the guide portion is pulled away from the outer periphery of the lid or from the outer periphery of the casing. In this manner, the operation member can be detached from the rotary damper. Therefore, even in a configuration where the knob portion extends to the guide portion, after the torque of the rotary damper is adjusted by the operation member, the operation member can be detached from the rotary damper. Accordingly, the rotary damper adjusted to have a desired braking torque can be reduced in size and weight so as to be attached to the devices.

According to the present invention, it is possible to provide a torque adjustment function-provided rotary damper capable of easily adjusting a torque by rotating a torque adjustment member, without needing to use a tool such as a screwdriver, and even in a case where a space cannot be secured on an end portion side of a casing of the rotary damper.

DETAILED DESCRIPTION

Next, a form for embodying a torque adjustment function-provided rotary damper according to the present invention will be described.

Figure 1:
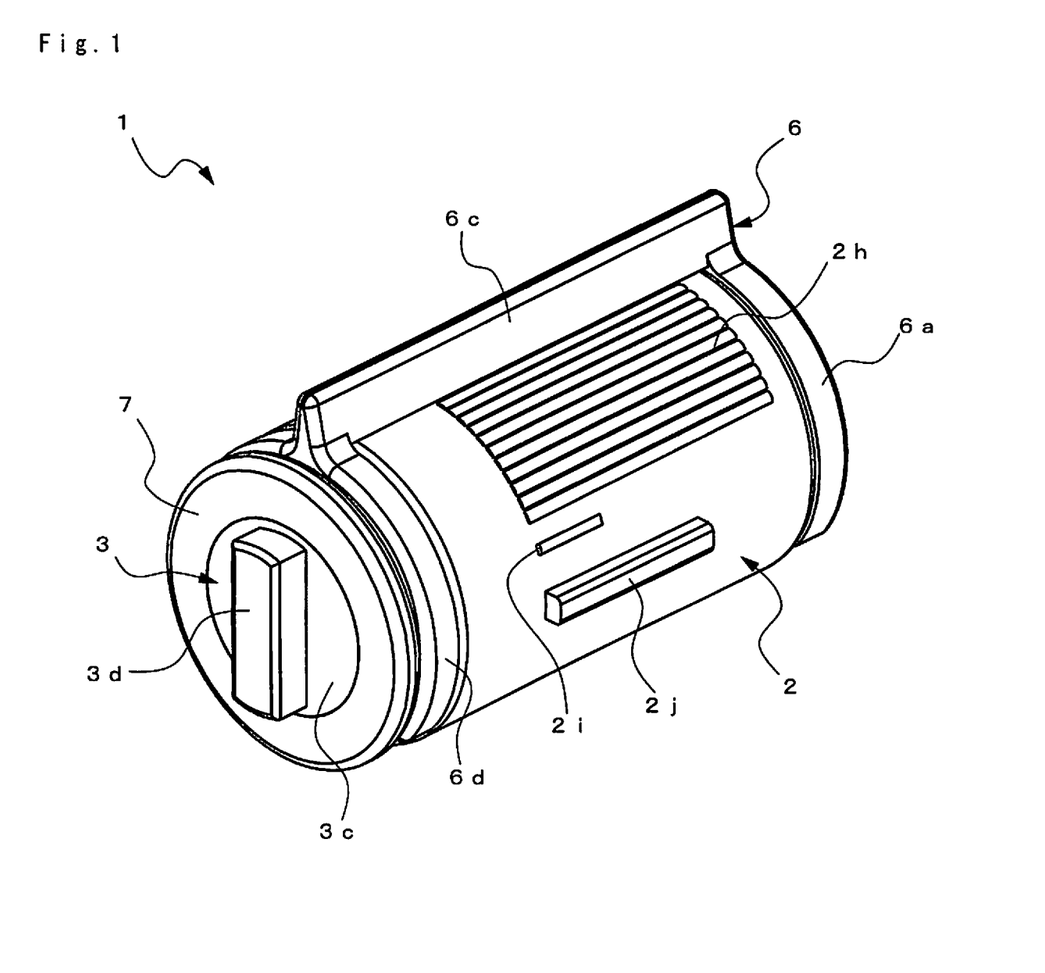
FIG. 1 is an external perspective view of a torque adjustment function-provided rotary damper according to an embodiment of the present invention.
Figure 2:
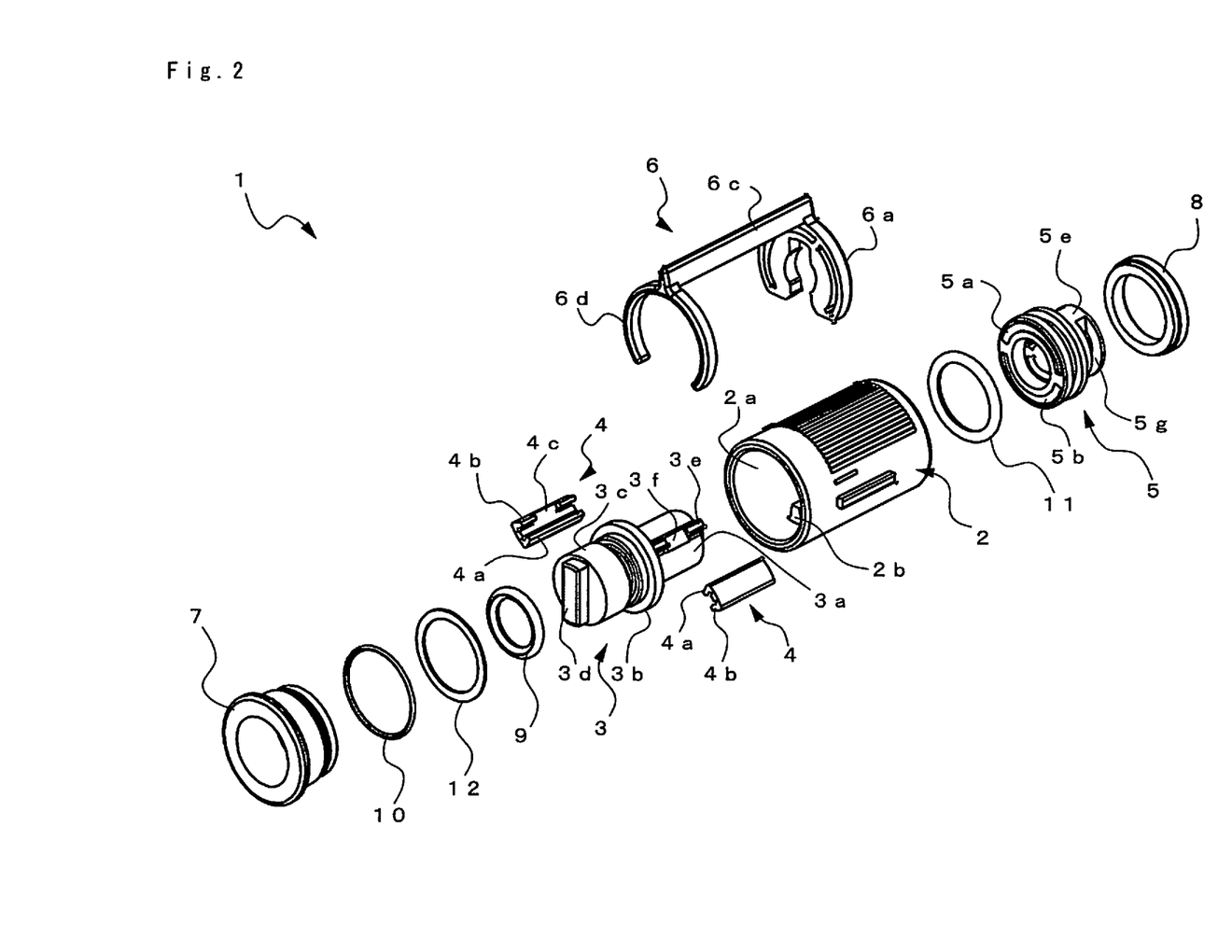
FIG. 2 is an exploded perspective view of the torque adjustment function-provided rotary damper according to the embodiment.
Figure 3A:
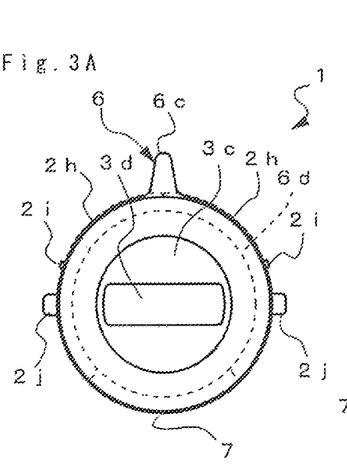
FIGS. 3A, 3B, and 3C are respectively a front view, a side view, and a rear view of the torque adjustment function-provided rotary damper according to the embodiment.
Figure 3B:
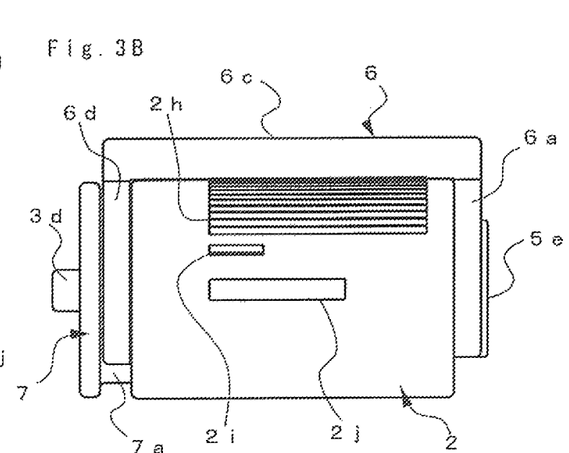
Figure 3C:
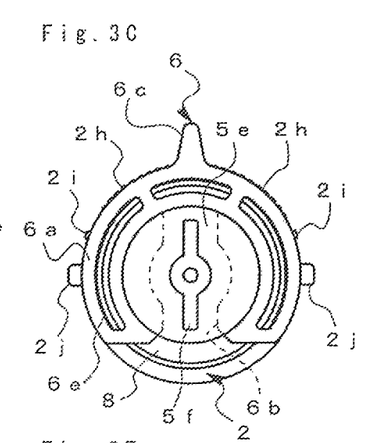

FIG. 1 is an external perspective view of a torque adjustment function-provided rotary damper 1 according to an embodiment of the present invention. FIG. 2 is an exploded perspective view thereof. In addition, FIG. 3A is a front view of the rotary damper 1. FIG. 3B is a side view thereof. FIG. 3C is a rear view thereof.

As main configuration elements, the rotary damper 1 includes a casing 2, a shaft 3, a vane 4, an adjuster 5, an adjustment lever 6, a shaft side cap 7, an adjuster side cap 8, O-rings 9, 10, and 11, and a sliding member 12.

Figure 3D:
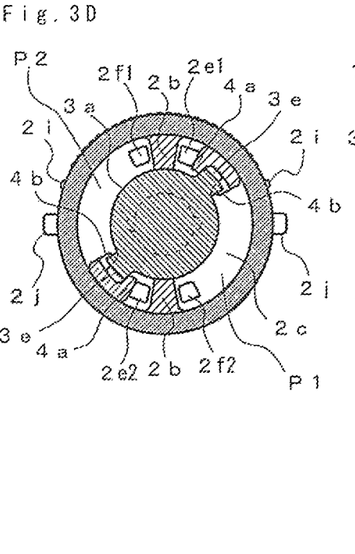
FIGS. 3D and 3E are a cross-sectional view and a longitudinal sectional view illustrating a state where an adjustment lever of the torque adjustment function-provided rotary damper according to the embodiment is detached.
Figure 3E:
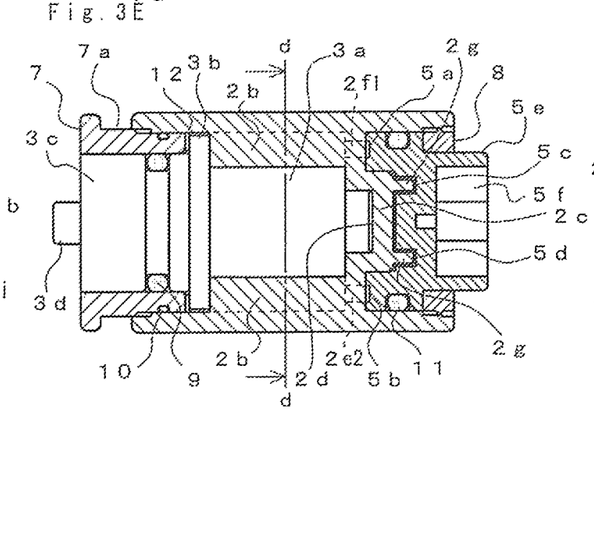

The casing 2 has a cylindrical shape, and a pressure chamber 2a formed in an inner space thereof is filled with a viscous fluid (not illustrated) such as silicone oil. The pressure chamber 2a has a partition wall 2b which is formed in an inner periphery in a depth direction thereof. A pair of the partition walls 2b are provided so that the partition walls 2b are positioned to face each other on the inner periphery of the pressure chamber 2a as illustrated in FIG. 3E. FIG. 3E is a longitudinal sectional view of the rotary damper 1 in a state where the adjustment lever 6 is detached. As illustrated in FIG. 3D, a cross-sectional shape of the partition wall 2b is substantially a fan shape, and the partition wall 2b protrudes at a predetermined height toward an axial center of the casing 2.

The casing 2 internally has a flange wall 2c formed by closing one end portion side of the pressure chamber 2a. A recess 2d is formed in the center on a surface of the flange wall 2c on the pressure chamber 2a side. The recess 2d has a shape to which a small diameter portion formed in a tip of a shaft portion 3a of the shaft 3 is fitted, and rotatably supports the tip of the shaft portion 3a. The shaft 3 is configured as a rotary member and the shaft portion 3a of the shaft 3 is rotatably accommodated in the pressure chamber 2a.

The shaft 3 has a flange portion 3b formed in a root of the shaft portion 3a, and the pressure chamber 2a is formed in a space interposed between the flange portion 3b and the flange wall 2c. A head portion 3c of the shaft 3 has a larger diameter than the shaft portion 3a. The O-ring 9 is disposed between the shaft side cap 7 that closes one end portion of the casing 2 and the head portion 3c, and the O-ring 10 is disposed between the shaft side cap 7 and an inner wall of the casing 2. The O-rings 9 and 10 prevent the viscous fluid from leaking outward of one end portion side of the casing 2 from the pressure chamber 2a. In addition, a sliding member 12 is inserted between a ring-shaped end surface of the shaft side cap 7 and the flange portion 3b, thereby preventing abrasion therebetween. A protruding portion 3d is formed in a rectangular parallelepiped shape on an end surface of the head portion 3c of the shaft 3 protruding from one end portion of the casing 2. The protruding portion 3d is attached to either a support member for supporting the rotary damper 1 or a rotary member rotated together with the rotary damper 1 of devices to which rotational braking is applied.

A top portion of the partition wall 2b formed on the inner wall of the casing 2 has a curved surface shape with an extremely slight gap from the outer periphery of the shaft portion 3a, and the outer periphery of the shaft portion 3a is close to the top portion of the partition wall 2b. FIG. 3D is a cross-sectional view of the rotary damper 1 which is taken along a broken line d-d in FIG. 3E and is viewed from an arrow direction. The outer periphery of the shaft portion 3a in the pressure chamber 2a has a blade portion 3e having a trapezoidal cross-sectional shape which is formed as illustrated in FIGS. 2 and 3D so as to protrude at a predetermined height in an axial direction of the shaft portion 3a. A pair of the blade portions 3e are provided such that the blade portions 3e are located at opposite positions on the outer periphery of the shaft portion 3a, and a central portion of the blade portions 3e is partially cut out to a predetermined length, thereby forming a cutout portion 3f. A length of the blade portion 3e in a longitudinal direction is set to be slightly shorter than a length of the partition wall 2b.

The vane 4 has a pair of side walls 4a and 4b. One side wall 4a closes the cutout portion 3f of the blade portion 3e in such a way that an inner surface of the side wall 4a comes into contact with one side surface of the blade portion 3e. An inner surface of the other side wall 4b comes into contact with the other side surface of the blade portion 3e. The other side wall 4b has a cutout portion 4c that opens the cutout portion 3f of the blade portion 3e in this case. In the vane 4, the respective side walls 4a and 4b are placed across the blade portion 3e with a certain amount of play. The outer periphery of the vane 4 comes into slidable contact with the inner periphery of the pressure chamber 2a, and a pair of the vanes 4 is disposed in the shaft 3. The length of the vane 4 in the longitudinal direction is set to approximately the same length as the blade portion 3e. When the vane 4 is attached across the blade portion 3e, both ends of the vane 4 in the longitudinal direction form slight gaps between the flange portion 3b and the flange wall 2c.

As illustrated in FIG. 3D, the pressure chamber 2a is divided into a first pressure chamber P1 and the second pressure chamber P2 around the axis of the shaft portion 3a by the partition wall 2b and the shaft portion 3a of the shaft 3.

If the shaft 3 is rotated in one direction, one side surface of the blade portion 3e is separated from an inner surface of one side wall 4a of the vane 4, and the other side surface of the blade portion 3e comes into contact with an inner surface of the other side wall 4b of the vane 4. In this state, a gap is formed between one side surface of the blade portion 3e and the inner surface of one side wall 4a of the vane 4, thereby forming a large flow path padding through the gap via the cutout portion 4c formed on the other side wall 4b of the vane 4 and the cutout portion 3f of the blade portion 3e. In addition, micro flow paths are respectively formed in the gap formed between one end of the vane 4 in the longitudinal direction and the flange portion 3b, and the gap formed between the other end of the vane 4 in the longitudinal direction and the flange wall 2c. Therefore, if the shaft 3 is rotated in one direction, the viscous fluid in the pressure chambers P1 and P2 moves rearward in the rotation direction passing through the large flow path and the micro flow paths from the front in the rotation direction. However, the micro flow path is smaller than the large flow path, and the large flow path is set to have a sufficiently large size. Accordingly, the viscous fluid passes through the large flow path without receiving strong resistance. Therefore, only a light rotational torque is applied to the rotation of the shaft 3.

In addition, if the shaft 3 is rotated in the other direction, one side surface of the blade portion 3e comes into contact with the inner surface of one side wall 4a of the vane 4, and the other side surface of the blade portion 3e is separated from the inner surface of the other side wall 4b of the vane 4. In this state, the cutout portion 3f formed in the blade portion 3e is closed by the inner surface of one side wall 4a of the vane 4, thereby closing the large flow path passing through the cutout portion 4c formed on the other side wall 4b of the vane 4 and the cutout portion 3f of the blade portion 3e. Therefore, the viscous fluid in the pressure chambers P1 and P2 moves rearward in the rotation direction from the front in the rotation direction passing through the micro flow paths formed by the slight gaps. Therefore, resistance applied to the viscous fluid increases, and the braking torque is applied to the rotation of the shaft 3.

That is, if the shaft 3 is rotated in one direction, the vane 4 and the blade portion 3e form the large flow path of the viscous fluid around the shaft portion 3a. If the shaft 3 is rotated in the other direction, the large flow path is closed. The vane 4 and the blade portion 3e thereby form a valve mechanism that applies the braking torque to the rotation of the shaft 3.

Figure 3F:
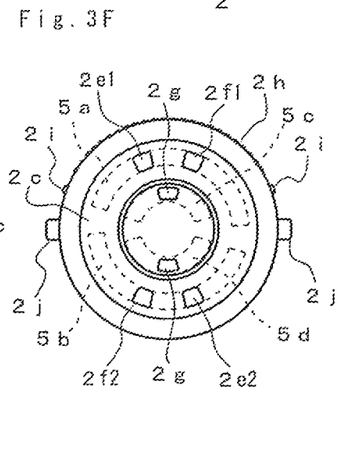
FIG. 3F is a rear view illustrating a state where an adjuster is further detached.

On the other end portion side of the casing 2, the adjuster 5 that configures the torque adjustment member is rotatably disposed in the casing 2 by coming into contact with a surface of the flange wall 2c opposite to the pressure chamber 2a. FIG. 3F is a rear view when the other end portion side of the casing 2 is viewed in a state where the adjuster 5 and the adjustment lever 6 are detached from the casing 2. The flange wall 2c has two sets of a pair of fluid passage holes 2e1 and 2f1 and a pair of fluid passage holes 2e2 and 2f2 which penetrate the pressure chamber 2a communicating with the inside and outside of the pressure chamber 2a. The two sets are formed across the partition wall 2b at an interval in the circumferential direction as illustrated in FIG. 3D. A surface of the adjuster 5 which comes into contact with the flange wall 2c has adjustment grooves 5a and 5b illustrated in FIGS. 2 and 3F, which communicate with the pair of fluid passage holes 2e1 and 2f1 and the pair of fluid passage holes 2e2 and 2f2 respectively. The adjustment grooves 5a and 5b are formed to change a cross-sectional area in the circumferential direction. In FIG. 3F, the adjuster 5 is not illustrated, but the adjustment grooves 5a and 5b are illustrated using dotted lines.

In the present embodiment, the respective adjustment grooves 5a and 5b are formed so that one end side is deepest and the adjustment grooves 5a and 5b gradually become shallower toward the other end side. The pair of fluid passage holes 2e1 and 2f1 are disposed to always face one adjustment groove 5a, and the pair of fluid passage holes 2e2 and 2f2 are disposed to always face the other adjustment groove 5b. Columnar projections 2g and 2g are formed to protrude on a surface of the flange wall 2c opposite to the pressure chamber 2a. The end portions of the columnar projections 2g and 2g are inserted into guide grooves 5c and 5d formed on the surface of the adjuster 5 facing the flange wall 2c, which are illustrated using dotted lines in FIG. 3F. A rotation angle of the adjuster 5 is restricted to fall within a range where both end portions of the guide grooves 5c and 5d collide with the columnar projections 2g and 2g. Due to this restriction, even if the adjuster 5 is rotated, the respective adjustment grooves 5a and 5b are located at positions in which the adjustment grooves 5a and 5b always face the pair of fluid passage holes 2e1 and 2f1 and the pair of fluid passage holes 2e2 and 2f2 respectively.

The torque of the rotary damper 1 for varying the braking torque applied to the shaft 3 is adjusted by rotating the adjuster 5. When the shaft 3 is rotated in the other direction, and the braking torque is applied to the shaft 3, the viscous fluid flows through the micro flow paths as described above, and the resistance applied to the viscous fluid increases. In this case, the viscous fluid also flows from the pressure chamber 2a to the adjustment grooves 5a and 5b via the pair of fluid passage holes 2e1 and 2f1 and the pair of fluid passage holes 2e2 and 2f2. That is, the viscous fluid in the pressure chamber P1 flows from the fluid passage hole 2e1 to the pressure chamber P2 via the fluid passage hole 2f1 after passing through the adjustment groove 5a. In addition, the viscous fluid in the pressure chamber P2 flows from the fluid passage hole 2e2 to the pressure chamber P1 via the fluid passage hole 2f2 after passing through the adjustment groove 5b. In this case, each depth of the adjustment grooves 5a and 5b through which the viscous fluid passes is a depth corresponding to the rotation angle of the adjuster 5. Therefore, by adjusting the rotation angle of the adjuster 5 to vary the depth of the respective adjustment grooves 5a and 5b through which the viscous fluid passes, the flowing amount of the viscous fluid is adjusted, and a magnitude of the braking torque applied to the shaft 3 can be adjusted to be a desired magnitude.

A position of the adjuster 5 relative to the flange wall 2c is defined by the other end portion of the casing 2 being closed with the adjuster side cap 8, and a surface for forming the adjustment grooves 5a and 5b is always brought into contact with a facing surface of the flange wall 2c. An O-ring 11 is disposed between the outer periphery of the adjuster 5 and the inner periphery of the casing 2, thereby preventing the viscous fluid from leaking from the other end portion of the casing 2.

Figure 4:
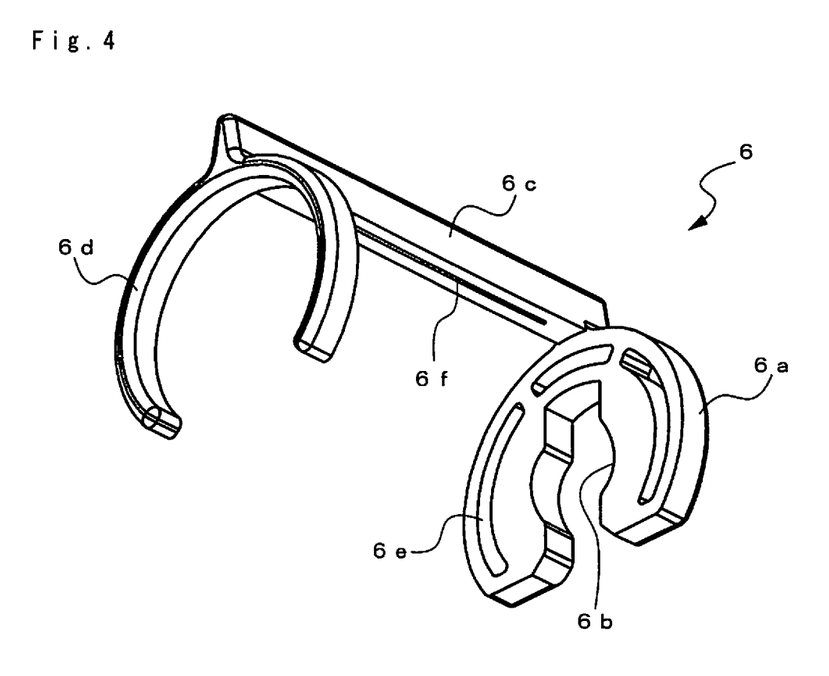
FIG. 4 is a perspective view of a single item of the adjustment lever that configures the torque adjustment function-provided rotary damper according to the embodiment.

The adjuster 5 has an adjustment end portion 5e exposed from the casing 2 on the other end portion side of the casing 2. A slotted groove 5f into which a tip of a slotted screwdriver is inserted as illustrated in FIG. 3C is formed on an exposed end surface of the adjustment end portion 5e, and a fitting portion 5g illustrated in FIG. 2 is formed in both side portions of the adjustment end portion 5e projecting from the other end portion of the casing 2. The fitting portion 5g has a shape fitted to the cutout 6b illustrated in FIG. 4, which is formed in the engagement portion 6a of the adjustment lever 6. FIG. 4 is a perspective view when the adjustment lever 6 is viewed from below. The adjustment lever 6 configures the operation member having the engagement portion 6a and the knob portion 6c.

By the cutout 6b being fitted into the fitting portion 5g, the engagement portion 6a engages with the adjustment end portion 5e, and is linked with the adjuster 5. The knob portion 6c protrudes in the radial direction from the outer periphery side of the casing 2, and is formed integrally with the engagement portion 6a. According to the present embodiment, the knob portion 6c extends to the guide portion 6d along the axial direction of the casing 2 in the outer periphery of the casing 2. The guide portion 6d configures the operation member 6 together with the engagement portion 6a and the knob portion 6c, and has a semi-ring shape which is partially cut out. The guide portion 6d is rotatably disposed along the outer periphery of the shaft side cap 7 that closes an end portion of the casing 2 opposite to a side where the adjustment end portion 5e is exposed.

Figure 5:
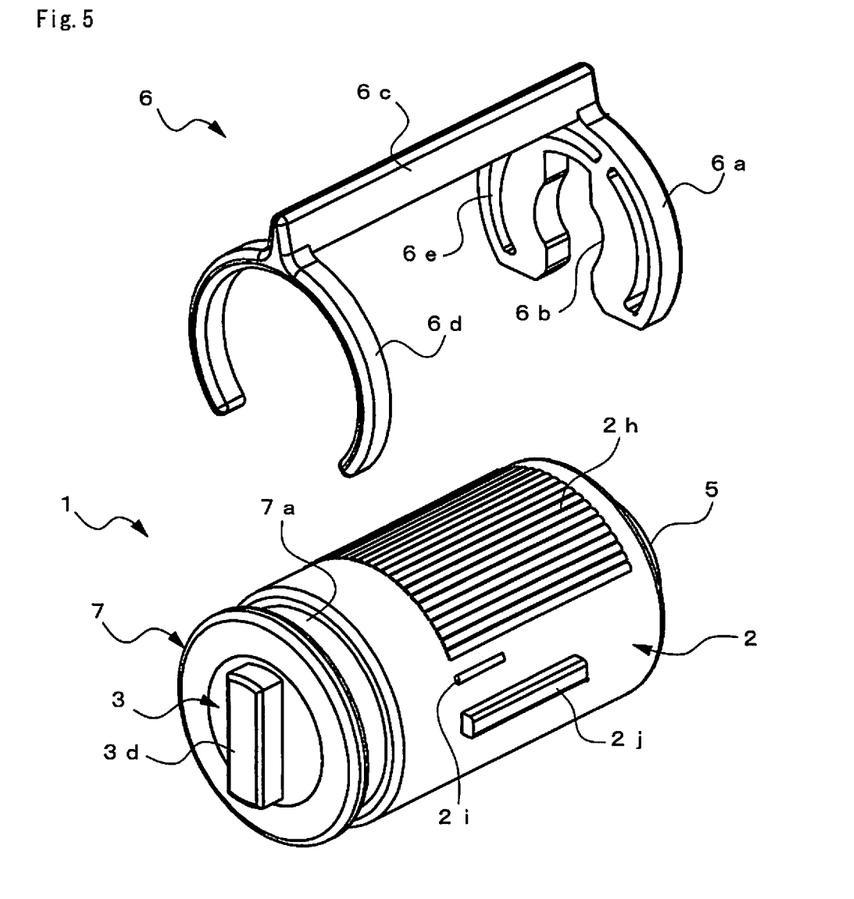
FIG. 5 is a perspective view illustrating a state where the adjustment lever of the torque adjustment function-provided rotary damper according to the embodiment is detached.

FIG. 5 is a perspective view of the rotary damper 1 in a state where the adjustment lever 6 is detached. As illustrated in FIGS. 5 and 3E, a step portion 7a having a slightly reduced outer diameter is formed between a flange-shaped end portion of the shaft side cap 7 and one end portion of the casing 2. The guide portion 6d is fitted to the step portion 7a, and comes into slidable contact with the outer periphery of the shaft side cap 7. The adjustment lever 6 is formed of a resin. The adjustment lever 6 has elasticity spreading to such an extent that the cutout 6b of the engagement portion 6a can be fitted to the fitting portion 5g and the engagement portion 6a fitted to the fitting portion 5g can be removed from the fitting portion 5g. The elasticity of the engagement portion 6a is set to proper elasticity by forming a punched portion 6e in the engagement portion 6a around the cutout 6b. In addition, the diameter of the semi-ring shaped guide portion 6d has elasticity spreading to such an extent that the guide portion 6d can be fitted to the step portion 7a and the guide portion 6d fitted to the step portion 7a can be removed from the step portion 7a. Therefore, the engagement portion 6a detachably engages with the adjustment end portion 5e, and the guide portion 6d is detachably disposed in the outer periphery of the shaft side cap 7.

The guide portion 6d may be configured to be rotatable along the outer periphery of the casing 2 in a location away from the end portion of the casing 2 where the adjustment end portion 5e is exposed, without being disposed in the step portion 7a of the shaft side cap 7. Even in this case, the guide portion 6d has the above-described elasticity. Accordingly, the guide portion 6d is detachably disposed in the outer periphery of the casing 2.

As illustrated in FIG. 4, the knob portion 6c has a knob side projection 6f formed on a surface facing the outer periphery of the casing 2. In addition, as illustrated in FIG. 5, a plurality of casing side grooves 2h which engage with the knob side projection 6f are formed in the outer periphery of the casing 2. The casing side groove 2h is configured to include a valley between a plurality of stripe-shaped projections having a semicircular cross section, which are formed adjacent to each other along the axial direction in the outer periphery of the casing 2. A configuration may be adopted as follows. A knob side groove is formed on the surface of the knob portion 6c which faces the outer periphery of the casing 2, and the plurality of stripe-shaped projections formed in the outer periphery of the casing 2 are used as a plurality of casing side projections which engage with the knob side groove.

In addition, in the outer periphery of the casing 2, a pair of small projections 2i which are shorter than the casing side groove 2h are formed in parallel to the casing side groove 2h on both sides across the plurality of casing side grooves 2h. The small projection 2i functions as a detent of the knob portion 6c by colliding with the knob side projection 6f formed in the knob portion 6c. A pair of large projections 2j having a rectangular parallelepiped shape larger than the small projection 2i are formed in the outer periphery of the casing 2 across the pair of small projections 2i. As described above, the protruding portion 3d formed on the end surface of the head portion 3c of the shaft 3 is attached to one of the support member and the rotary member of the devices to which the rotational braking is applied. However, the large projection 2j is attached to the other of the rotary member and the support member of the devices to which the rotational braking is applied.

According to the torque adjustment function-provided rotary damper 1 of the present embodiment as described above, in a state where the rotary damper 1 is attached to the devices, even in a case where a space cannot be secured on the end portion side of the casing 2 of the rotary damper 1, the knob portion 6c of the adjustment lever 6 protrudes in the radial direction from the outer periphery side of the casing 2. Therefore, the knob portion 6c can be touched from the outer periphery side of the casing 2. Therefore, the knob portion 6c of the adjustment lever 6 is touched, and the knob portion 6c is rotated along the outer periphery of the casing 2. In this manner, the adjuster 5 in which the adjustment end portion 5e engages with the engagement portion 6a of the adjustment lever 6 is rotated together with the knob portion 6c. Therefore, without needing to use a tool such as a screwdriver, and even in a case where the space cannot be secured on the end portion side of the casing 2 of the rotary damper 1, the torque can easily be adjusted by rotating the adjuster 5.

In the rotary damper 1 according to the present embodiment, the slotted groove 5f is formed on the exposed end surface of the adjuster 5. Accordingly, in a case where the space can be secured on the end portion side of the casing 2, the torque can be adjusted by rotating the adjuster 5 in such a way that the adjuster 5 is rotated by inserting the tool such as the screwdriver into the slotted groove 5f.

In addition, in the rotary damper 1 according to the present embodiment, as described above, the engagement portion 6a detachably engages with the adjustment end portion 5e, and the guide portion 6d is detachably disposed in the outer periphery of the shaft side cap 7 or in the outer periphery of the casing 2. Therefore, the engagement portion 6a of the adjustment lever 6 and the adjustment end portion 5e of the adjuster 5 are disengaged from each other, and the guide portion 6d is pulled away from the step portion 7a of the shaft side cap 7 or the outer periphery of the casing 2. In this manner, the adjustment lever 6 can be detached from the rotary damper 1. Therefore, after the torque of the rotary damper 1 is adjusted by the adjustment lever 6, the adjustment lever 6 can be detached from the rotary damper 1. Accordingly, the rotary damper 1 adjusted to have a desired braking torque can be reduced in size and weight so as to be attached to the devices.

In addition, according to the rotary damper 1 of the present embodiment, the knob portion 6c of the adjustment lever 6 extends to the guide portion 6d from the end portion of the casing 2 where the adjustment end portion 5e is exposed. Accordingly, a range where the knob portion 6c can be touched is broadened. Therefore, in various states where the rotary damper 1 is attached to the devices, the knob portion 6c can easily be touched. Therefore, the operation range of the adjustment lever 6 is broadened, the torque can easily be adjusted in various attachment situations of the rotary damper 1. In addition, since the guide portion 6d is provided, the knob portion 6c moves while being guided by the guide portion 6d, and the adjustment lever 6 can be smoothly operated.

In addition, according to the rotary damper 1 of the present embodiment, if the knob portion 6c is rotated along the outer periphery of the casing 2, the knob side projection 6f or the knob side groove formed in the knob portion 6c successively engages with the plurality of casing side grooves 2h or the plurality of casing side projections formed in the outer periphery of the casing 2. The rotation position of the knob portion 6c is maintained at any engagement position thereof. In addition, if the knob portion 6c is rotated, a click feeling is obtained by the engagement between the projection 6f and the groove 2h.

Therefore, an operator of the adjustment lever 6 is likely to recognize the engagement position between the knob portion 6c and the casing 2, that is, the rotation position of the adjuster 5. Therefore, the operator of the adjustment lever 6 can tactilely identify a magnitude of the braking torque for adjusting the torque.

In the rotary damper 1 according to the present embodiment, a case has been described where the knob portion 6c extends to the guide portion 6d. However, the knob portion 6c may not necessarily extend to the guide portion 6d, and may be configured only to protrude in the radial direction of the casing 2 from the outer periphery side of the casing 2. Even according to this configuration, operational effects the same as those of the rotary damper 1 according to the present embodiment can be achieved. In this case, the knob portion 6c is formed to extend in the axial direction of the casing 2 as much as the length for forming the knob side projection 6f or the knob side groove. Alternatively, without extending in the axial direction, the knob portion 6c is formed to have the thickness approximately the same as the thickness of the engagement portion 6a. In this case, a facing surface that faces the outer peripheral surface of the casing 2 is disposed in a portion where the knob portion 6c is connected to the engagement portion 6a, and the knob side projection or the knob side groove is formed on the facing surface. In this manner, the operator is likely to recognize the rotation position of the adjuster 5 as in the present embodiment.

In addition, even in a configuration where the knob portion 6c does not extend to the guide portion 6d, the engagement portion 6a is configured to detachably engage with the adjustment end portion 5e, and the engagement portion 6a of the adjustment lever 6 and the adjustment end portion 5e of the adjuster 5 are disengaged from each other. In this manner, the adjustment lever 6 can be detached from the rotary damper 1. Therefore, even in a case where the knob portion 6c is configured in this way, the torque of the rotary damper 1 is adjusted by the adjustment lever 6. Thereafter, the adjustment lever 6 is detached from the rotary damper 1. In this manner, the rotary damper 1 provided with the desired braking torque can be reduced in size and weight so as to be attached to the devices.

What is claimed is:

1. A torque adjustment function-provided rotary damper comprising:
    a casing that internally has a pressure chamber;
    a rotary member having a shaft portion rotatably accommodated in the pressure chamber;
    a flange wall closing one end portion side of the pressure chamber, the flange wall rotatably supporting a tip of the shaft portion, and in which flange wall a pair of fluid passage holes penetrating the pressure chamber and communicating with the inside and outside of the pressure chamber are formed at an interval in a circumferential direction;
    a viscous fluid that internally fills the pressure chamber;
    a valve mechanism forming a large flow path of the viscous fluid around the shaft portion if the rotary member is rotated in one direction, and applying a braking torque to the rotation of the rotary member by closing the large flow path if the rotary member is rotated in the other direction;
    a torque adjustment member rotatably disposed in the casing and being in contact with a surface of the flange wall opposite to the pressure chamber, the torque adjustment member having an adjustment end portion exposed from the casing, and a groove communicating with the pair of fluid passage holes is formed in the torque adjustment member on a surface which the flange wall contacts so that a cross-sectional area is changed in the circumferential direction; and
    an operation member having an engagement portion linked with the torque adjustment member by engaging with the adjustment end portion, and a knob portion formed integrally with the engagement portion by protruding in a radial direction from an outer periphery side of the casing.

2. The torque adjustment function-provided rotary damper according to claim 1, wherein the engagement portion detachably engages with the adjustment end portion.

3. The torque adjustment function-provided rotary damper according to claim 1, wherein the operation member has a guide portion rotatably disposed along an outer periphery of a lid that closes a casing end portion on a side opposite to a side where the adjustment end portion is exposed, or along an outer periphery of the casing at a location away from the casing end portion where the adjustment end portion is exposed, and the knob portion extends to the guide portion in an axial direction of the casing along the outer periphery of the casing.

4. The torque adjustment function-provided rotary damper according to claim 3, wherein the knob portion has a knob side projection or a knob side groove formed on a surface facing the outer periphery of the casing, and the outer periphery of the casing has a plurality of casing side grooves engaging with the knob side projection or a plurality of casing side projections engaging with the knob side groove.

5. The torque adjustment function-provided rotary damper according to claim 3, wherein the engagement portion detachably engages with the adjustment end portion, and the guide portion is detachably disposed in the outer periphery of the lid or in the outer periphery of the casing.

* * * * *